United States Patent Office 2,812,327
Patented Nov. 5, 1957

2,812,327
BASIC ETHERS OF CARBINOLS SUBSTITUTED BY ENDOCYCLIC GROUPS, AND A PROCESS OF MAKING SAME

Gerhard Ohnacker and August Kottler, Biberach, Germany, assignors to Dr. Karl Thomae G. m. b. H., Riss, Germany, a corporation of Germany No Drawing. Application April 12, 1955,
Serial No. 500,985

Claims priority, application Germany April 14, 1954

14 Claims. (Cl. 260—247.7)

This invention relates to basic ethers, and more particularly to basic ethers of carbinols substituted by endocyclic groups, to their acid addition salts and quaternary ammonium compounds, and to a process of making same.

It is one object of the present invention to provide new and valuable basic ethers of carbinols substituted by endocyclic groups, said ethers being highly effective spasmolytic agents.

Another object of the present invention is to provide acid addition salts of such new and valuable basic ethers.

Still another object of the present invention is to provide quaternary ammonium compounds of such new and valuable basic ethers.

A further object of the present invention is to provide valuable therapeutic preparations comprising said new basic ethers and their acid addition salts and quaternary ammonium compounds, said therapeutic preparations being useful as spasmolytic agents.

Another object of the present invention is to provide new and valuable carbinols substituted by endocyclic groups, said carbinols being useful as starting materials for producing new and valuable basic ethers thereof.

Another object of the present invention is to provide an advantageous, simple, and very effective process of making such new and valuable basic ethers of carbinols substituted by endocyclic groups and of preparing their acid addition salts and quaternary ammonium compounds.

Other objects of the present invention and advantageous features thereof will become apparent as the description proceeds.

The new and valuable basic ethers of carbinols substituted by endocyclic groups, as they are produced according to the process of the present invention, correspond to the following formula

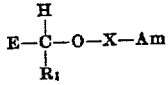

Their tertiary and quaternary salts which are also obtained by the process according to the present invention correspond to the following formula

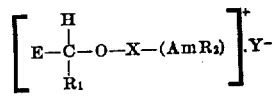

In these formulas
E indicates the endocyclic group, i. e. the 2,5-endomethylene cyclohexyl or the 2,5-endomethylene-Δ3-cyclohexenyl group;
X indicates an alkylene group of straight chain or branched structure and preferably a lower alkylene group with 2 to 4 carbon atoms;
Am indicates a dialkylamino group and preferably a di-(lower) alkylamino group with one to five carbon atoms in each alkyl radical, a pyrrolidino, a piperidino, or a morpholino group;

$R_1$ indicates the 2,5-endomethylene-Δ3-cyclohexenyl, the 2,5-endomethylene cyclohexyl, the pyridyl, the cyclohexyl, or a phenyl group of the formula

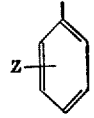

wherein Z is hydrogen, halogen, an alkyl group, or an alkoxy group and preferably a lower alkyl or a lower alkoxy group with one to five carbon atoms;
$R_2$ indicates hydrogen, an alkyl group and preferably a lower alkyl group with one to five carbon atoms, or an aralkyl group and preferably an aryl-(lower) alkyl group; and
Y indicates the anion of an inorganic acid and preferably halogen, the alkyl sulfate anion, or an anion of an organic carboxylic acid and preferably of a pharmaceutically acceptable acid.

Said new compounds are obtained according to the process of the present invention by reacting carbinols substituted by at least one endocyclic group and corresponding to the formula

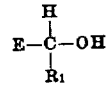

with tertiary amino alkyl halogenides of the formula

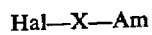

Hal—X—Am wherein E, $R_1$, X and Am indicate the same substituents as stated above and Hal represents halogen. Said reaction can be carried out in the absence of solvents or in the presence of solvents, such as, for example, benzene, toluence, or alkanols such as ethanol, and in the presence of hydrogen halide binding agents, such as alkali metals, alkali amides, alkali alcoholates, or alkali hydroxides, and alkali carbonates.

The resulting therapeutically valuable amino ethers may, if desired, be converted into their acid addition salts, for example, by means of suitable inorganic acids, such as hydrogen halides, or suitable organic carboxylic acids, such as citric acid. Their quaternary ammonium compounds may be made, for example, by reaction with alkyl or aralkyl halogenides or with dialkyl sulfates.

Reaction of said endocyclic carbinols with said tertiary amino alkyl halides is effected at temperatures between about 20° C. and about 150° C. When using a solvent, the reaction is preferably carried out at the boiling temperature of said solvent.

Preferably sodium compounds, such as sodium metal, sodium amide, sodium alcoholate, or sodium hydroxide, are used as hydrogen halide binding agents.

The resulting amino ethers can be converted into their acid addition salts and quaternary ammonium compounds in the absence of solvents. Said salt formation, however, can also be effected in the presence of solvents such as, for instance, ether, ethanol, acetone, acetic acid ester, or benzene. This reaction may be carried out at a low temperature and while cooling, as well as at a temperature between about 30° C. and about 150° C., preferably at the boiling temperature of the solvent if present, and, if required, by heating in a sealed tube.

It is possible to convert the resulting basic ethers substituted by a 2,5-endomethylene-Δ3-cyclohexenyl group into the corresponding basic ethers with a saturated endocyclic group by catalytic hydrogenation.

The new compounds described and claimed herein are highly effective spasmolytic agents with musculotropic and neurotropic components. In contrast to known basic ethers of carbinols which do not carry endocyclic substituents, the new ethers possess a different and considerably broadened range of action.

The following examples serve to illustrate the present invention without, however, limiting the same thereto.

*Example I*

(a) Preparation of (2,5 - endomethylene - $\Delta_3$ - cyclohexenyl) phenyl carbinol-$\beta$-dimethylamino ethyl ether and its hydrochloride:

22.5 g. of (2,5-endomethylene-$\Delta_3$-cyclohexenyl) phenyl carbinol dissolved in 50 g. of toluene are added to 200 g. of toluene containing 2.7 g. of pulverized sodium metal. The mixture is heated under reflux for 28 hours. After cooling, the toluene solution is removed by decanting from unreacted sodium metal powder. 12.7 g. of dimethylamino ethyl chloride are added to the cold toluene solution which is then slowly heated and kept at boiling temperature for 22 hours. The resulting reaction mixture is cooled, washed three times with water, and extracted by means of 2 N hydrochloric acid. Potassium carbonate is added to the hydrochloric acid solution whereby the amino ether is set free. Said amino ether is dissolved in ether, the ethereal solution is dried over sodium sulfate, the ether is removed by evaporation, and the resulting evaporation residue is distilled in a high vacuum. The amino ether distills at 130–132° C./0.1 mm. Hg. The yield amounts to 50% of the theoretical yield.

To prepare its hydrochloride, said amino ether is dissolved in ether and gaseous hydrochloric acid is introduced into said ethereal solution. The precipitated hydrochloride is recrystallized from acetic acid ethyl ester. Its melting point is 140° C.

(b) Preparation of bis-(2,5-endomethylene-$\Delta_3$-cyclohexenyl) carbinol-$\beta$-diethylamino ethyl ether:

Following the same procedure and using the same molecular proportions as in (a) above, the corresponding basic ether is obtained by reacting bis-(2,5-endomethylene-$\Delta_3$-cyclohexenyl) carbinol with $\beta$-diethylamino ethyl chloride. The resulting basic ether has a boiling point: 205–206° C./11 mm. Hg. The yield amounts to 35% of the theoretical yield.

Its hydrochloride has a melting point of 169–171° C., after recrystallization from a mixture of isopropanol and ether (1:1).

(c) Preparation of (2,5 - endomethylene - $\Delta_3$ - cyclohexenyl)-p-methoxy phenyl carbinol-$\beta$-dimethylamino ethyl ether:

Following the same procedure and using the same molecular proportions as in (a) above, the corresponding basic ether may be produced by reacting (2,5-endomethylene-$\Delta_3$-cyclohexenyl)-p-methoxy phenyl carbinol with dimethylamino ethyl chloride. The resulting basic ether has a boiling point 147–149° C./1 mm. Hg. The yield amounts to 63% of the theoretical yield.

Treating an alcoholic solution of said base with the equivalent amount of tartaric acid yields the tartrate having melting point of 98° C. Said salt is hygroscopic.

(d) Following the same procedure and using the same molecular proportions as in (a) above, the corresponding (2,5-endomethylene-$\Delta_3$-cyclohexenyl) - p - bromo phenyl carbinol-$\beta$-dimethylamino ethyl ether is obtained by reacting (2,5 - endomethylene - $\Delta_3$ - cyclohexenyl)-p-bromo phenyl carbinol with dimethylamino ethyl chloride. Said basic ether has a boiling point of 172–174° C./0.6 mm. Hg. The yield amounts to 54% of the theoretical yield.

Treating an alcoholic solution of said base with the equivalent amount of oxalic acid yields the oxalate having a melting point of 114° C. Said salt is hygroscopic.

*Example II*

The amino ether described in Example I (a) above may also be produced by heating a mixture of 0.2 mol of (2,5-endomethylene - $\Delta_3$ - cyclohexenyl) phenyl carbinol with 0.2 mol of dimethylamino ethyl chloride hydrochloride and 0.4 mol of pulverized sodium hydroxide at 95–100° C. for 10 hours. The reaction product is dissolved in 2 N hydrochloric acid, washed with ether, and worked up as described in Example I (a).

*Example III*

The amino ether described in Example I (a) may also be produced by heating to boiling a mixture of 0.2 mol of (2,5-endomethylene-$\Delta_3$-cyclohexenyl) phenyl carbinol, 0.2 mol of dimethylamino ethyl chloride, 0.2 mol of pulverized sodium hydroxide, and 100 cc. of toluene for 7 hours. The reaction product is worked up as described in Example I (a).

*Example IV*

The amino ether described in Example I (a) may also be produced by heating a mixture of 0.2 mol of (2,5-endomethylene-$\Delta_3$-cyclohexenyl) phenyl carbinol, 0.2 mol of dimethylamino ethyl chloride hydrochloride, 0.4 mol of sodium hydroxide in the form of a 50% aqueous solution, and 150 cc. of toluene to boiling for 8 hours. The reaction product is worked up as described in Example I (a).

*Example V*

The amino ether described in Example I (a) is also obtained by first heating on a steam bath 4.4 g. of (2,5-endomethylene-$\Delta_3$-cyclohexenyl) phenyl carbinol in a suspension of 7 g. of potassium carbonate in 120 cc. of absolute ethanol for 30 minutes. 2.2 g. of dimethylamino ethyl chloride are added to said mixture, the temperature of which is then kept at 95–100° C. for 6 more hours. The solvent is removed by distillation and the residue is extracted by means of 2 N hydrochloric acid. The resulting acid solution is worked up as described in Example I (a).

*Example VI*

Preparation of (2,5-endomethylene - $\Delta_3$ - cyclohexenyl) phenyl carbinol diethylamino ethyl ether:

A suspension of 2.3 g. of pulverized metallic sodium in benzene is reacted with 19 g. of (2,5-endomethylene-$\Delta_3$-cyclohexenyl) phenyl carbinol and 14.1 g. of diethylamino ethyl chloride as described in Example I (a). On working up the reaction mixture, the amino ether is obtained in a yield of 65% of the theoretical yield. Its boiling point is 171–173° C./0.1 mm. Hg.

Its hydrochloride is prepared in ethereal solution as described in Example I (a) and is recrystallized from acetic acid ethyl ester. Its melting point is 116–118° C.

*Example VII*

Preparation of (2,5 - endomethylene-$\Delta_3$-cyclohexenyl) phenyl carbinol-$\beta$-dimethylamino propyl ether:

A suspension of 4.6 g. of finely pulverized metallic sodium in toluene is reacted with 38 g. of (2,5-endomethylene-$\Delta_3$-cyclohexenyl) phenyl carbinol and 24.5 g. of dimethylamino isopropyl chloride and the reaction mixture is worked up as described in Example I (a). The amino ether is obtained in a yield of 55% of the theoretical. Its boiling point is 135–136° C./0.03 mm. Hg.

In order to produce the citrate of said amino ether, equimolecular amounts of citric acid and said amino ether are dissolved in a small amount of isopropanol by heating on the water bath. The resulting solution is kept at 0° C. for 24 hours. The precipitated citrate is filtered off by suction and is recrystallized from isopropanol. Its melting point is 60° C. The salt is hygroscopic.

*Example VIII*

(a) Preparation of bis - (2,5-endomethylene-$\Delta_3$-cyclohexenyl) carbinol-$\gamma$-diethylamino propyl ether:

2.5 g. of sodium amide are added to 10.5 g. of bis-(2,5-endomethylene-$\Delta_3$-cyclohexenyl) carbinol dissolved in 200 cc. of toluene. The reaction mixture is boiled under reflux for 12 hours. 7.5 g. of $\gamma$-diethylamino propyl chloride are added thereto and the mixture is heated to boiling for 12 more hours. The reaction product is worked up as described in Example I (a). The yield amounts to 42% of the theoretical yield. The boiling point of the resulting amino ether is 205–206° C./7 mm. Hg.

The citrate of said amino ether is prepared as described in Example VII and is recrystallized from a small quantity of water. Its melting point is 145° C.

(b) Production of (2,5 - endomethylene - Δ₃ - cyclohexenyl)-m-tolyl carbinol-β-dimethylamino ethyl ether.

Following the same procedure and using the same molecular proportions as in the above mentioned Example VIII, (a), the corresponding basic ether is obtained by reacting (2,5-endomethylene-Δ₃-cyclohexenyl)-m-tolyl carbinol with β-dimethylamino ethyl chloride. The resulting basic ether has a boiling point of 139–141° C./0.2 mm. Hg.

Its hydrochloride is recrystallized from a mixture of acetic acid ethyl ester and ether (2:1), and has a melting point of 130–131° C.

Example IX

Preparation of (2,5 - endomethylene-Δ₃-cyclohexenyl) phenyl carbinol pyrrolidino ethyl ether:

A solution of 0.2 mol of the sodium salt of (2,5-endomethylene-Δ₃-cyclohexenyl) phenyl carbinol in toluene, prepared as described in Example I (a) is heated under reflux with 22 g. of pyrrolidino ethyl chloride for 40 hours. The reaction mixture is worked up as described in Example I (a). The yield amounts to 42% of the theoretical yield. The boiling point of the resulting amino ether is 168–170° C./0.5 mm. Hg.

The hydrochloride is prepared from an ethereal solution of said amino ether as described in Example I (a) and is recrystallized from acetic acid ethyl ester. Its melting point is 147° C. The melting point of the citrate is 134–135° C.

Example X

Preparation of (2,5-endomethylene - Δ₃ - cyclohexenyl) phenyl carbinol piperidino ethyl ether:

A solution of 0.2 mol of the sodium salt of (2,5-endomethylene-Δ₃-cyclohexenyl) phenyl carbinol in toluene, obtained according to Example I (a) is heated under reflux with 29.5 g. of piperidino ethyl chloride for 48 hours. The reaction mixture is worked up as described in Example I (a). The yield amounts to 52% of the theoretical yield. The boiling point of the resulting amino ether is 151–152° C./0.03 mm. Hg.

The hydrochloride is prepared from an ethereal solution of said amino ether and is recrystallized from acetic acid ethyl ester. Its melting point is 174° C.

Example XI

Preparation of (2,5 - endomethylene-Δ₃-cyclohexenyl) phenyl carbinol morpholino ethyl ether:

A solution of 0.1 mol of the sodium salt of (2,5-endomethylene-Δ₃-cyclohexenyl) phenyl carbinol in toluene, obtained according to Example I (a) is heated under reflux with 16 g. of morpholino ethyl chloride for 48 hours. The reaction mixture is worked up as described in Example I (a). The yield amounts to 54% of the theoretical yield. The boiling point of the resulting amino ether is 159–160° C./0.4 mm. Hg.

The hydrochloride is prepared from an ethereal solution of said amino ether and is recrystallized from acetic acid ethyl ester. Its melting point is 181° C.

Example XII

Preparation of (2,5 - endomethylene-Δ₃-cyclohexenyl)-(m-tolyl) carbinol diethylamino ethyl ether:

200 cc. of toluene, 1.2 g. of metallic sodium in dust form, and 10.7 g. of (2,5 - endomethylene - Δ₃ - cyclohexenyl)-(m-tolyl) carbinol are boiled under reflux for 36 hours. 6.8 g. of diethylamino ethyl chloride are added thereto and the mixture is heated to boiling for 44 more hours. The resulting reaction mixture is worked up as described in Example I (a). The yield amounts to 41% of the theoretical yield. The boiling point of the resulting amino ether is 130–131° C./0.8 mm. Hg.

The hydrochloride of said amino ether, on recrystallization from acetic acid ethyl ester, melts at 131° C.

Example XIII

Preparation of (2,5-endomethylene cyclohexyl) phenyl carbinol dimethylamino ethyl ether:

200 cc. of toluene, 1.9 g. of metallic sodium in dust form, 16.8 g. of (2,5-endomethylene cyclohexyl) phenyl carbinol, and 9.5 g. of dimethylamino ethyl chloride are heated under reflux for 38 hours. The reaction mixture is worked up as described in Example I, (a). The resulting amino ether has a boiling point of 131° C./0.1 mm. The yield amounts to 40% of the theoretical yield.

The hydrochloride of said amino ether, on recrystallization from acetic acid ethyl ester, melts at 147° C.

Example XIV

Preparation of (2,5-endomethylene-Δ₃-cyclohexenyl)-(m-butoxy phenyl) carbinol dimethylamino ethyl ether:

200 cc. of toluene, 1.1 g. of metallic sodium in dust form, 13.6 g. of (2,5-endomethylene-Δ₃-cyclohexenyl)-(m-butoxy phenyl) carbinol, and 5 g. of dimethylamino ethyl chloride are boiled under reflux for 60 hours. The reaction mixture is worked up as described in Example 1 (a). The yield amounts to 54% of the theoretical yield. The boiling point of the resulting amino ether is 161–162° C./0.9 mm. Hg.

Example XV

Preparation of (2,5-endomethylene-Δ₃-cyclohexenyl)-(p-chloro phenyl) carbinol diethylamino ethyl ether:

60 cc. of toluene, 4.4 g. of sodium amide, 23.4 g. of (2,5-endomethylene-Δ₃-cyclohexenyl)-(p-chloro phenyl) carbinol, and 13.6 g. of diethylamino ethyl chloride are heated to boiling for 7 hours. The reaction mixture is worked up as described in Example I (a). The boiling point of the resulting amino ether is 188–189° C./0.8 mm. Hg. The yield amounts to 50% of the theoretical yield.

Example XVI

Preparation of (2,5-endomethylene-Δ₃-cyclohexenyl)-(2-pyridyl) carbinol diethylamino ethyl ether:

10 g. of (2,5 - endomethylene - Δ₃ - cyclohexenyl) - (2-pyridyl) carbinol and 2.5 g. of sodium amide are heated under reflux in 200 cc. of toluene for 2 hours. 6.8 g. of diethylamino ethyl chloride are added and the mixture is heated to boiling for 16 more hours. The reaction mixture is worked up as described in Example I (a). The resulting amino ether has a boiling point of 141° C./0.05 mm. Hg. The yield amounts to 64% of the theoretical yield.

Example XVII (a) Preparation of (2,5 - endomethylene - Δ₃ - cyclohexenyl)-(p-chloro phenyl) carbinol diethylamino ethyl ether methoiodide:

3.3 g. of the compound described in Example XV are dissolved in 20 cc. of acetic acid ethyl ester. 2.8 g. of methyl iodide are added thereto and the mixture is heated in a sealed tube to 90° C. for one hour. Ether is added to the reaction product and the mixture is kept at 0° C. for 24 hours. The precipitated crystals are filtered off by suction and are recrystallized from acetic acid ethyl ester. The resulting methoiodide has a melting point of 116° C. The yield amounts to 68% of the theoretical yield.

(b) Preparation of (2,5 - endomethylene - Δ₃ - cyclohexenyl) phenyl carbinol dimethylamino ethyl ether methoiodide:

Following the same procedure and using the same molecular proportions as in Example XVII (a) above, the corresponding methoiodide is obtained by reacting the ether base prepared according to Example I (a) with methyl iodide. The resulting quaternary compound, on recrystallization from isopropanol, has a melting point of 166–168° C. The yield amounts to 72% of the theoretical yield.

(c) Preparation of (2,5 - endomethylene - Δ₃ - cyclohexenyl) phenyl carbinol-β-diethylamino ethyl ether methoiodide:

Following the same procedure and using the same molecular proportions as in Example XVII (a) above, the corresponding methoiodide is obtained by reacting the ether base prepared according to Example VI with methyl iodide. The resulting quaternary compound, on recrystallization from a mixture from acetone and ether (1:2), has a melting point of 92–94° C. The yield amounts to 76% of the theoretical yield.

(d) Preparation of (2,5-endomethylene cyclohexyl) phenyl carbinol-β-dimethylamino ethyl ether methoiodide:

Following the same procedure and using the same molecular proportions as in Example XVII (a) above, the corresponding methoiodide is obtained by reacting the ether base prepared according to Example XIII with methyl iodide. The resulting quaternary compound, on recrystallization from isopropanol, has a melting point of 177–179° C. The yield amounts to 84% of the theoretical yield.

*Example XVIII*

(a) Preparation of (2,5 - endomethylene - Δ₃ - cyclohexenyl) phenyl carbinol dimethyl amino ethyl ether methobromide:

A mixture of the amino ether described in Example I (a) and a solution of liquid methyl bromide in methanol in an amount corresponding to 4 times the equimolecular amount is allowed to stand at —20° C. for 24 hours. The methanol is then removed by distillation in a vacuum. Crystallization is brought about by the addition of anhydrous ether. The crystals are filtered off by suction and are recrystallized from a mixture of isopropanol and ether (1:1). The melting point of the resulting methobromide is 167° C. The yield amounts to 80% of the theoretical yield.

(b) Preparation of (2,5 - endomethylene - Δ₃ - cyclohexenyl) phenyl carbinol-β-diethylamino ethyl ether methylobromide:

Following the same procedure and using the same molecular proportions as in Example XVIII (a), the corresponding methylobromide is obtained by reacting the ether base prepared according to Example VI with methylbromide. The resulting quaternary compound, on recrystallization from acetic acid ethyl ester, has a melting point of 126–128° C. The yield amounts to 88% of the theoretical yield.

(c) Preparation of (2,5 - endomethylene - Δ₃ - cyclohexenyl) phenyl carbinol-β-(1-pyrrolidino) ethyl ether methylobromide:

Following the same procedure and using the same molecular proportions as in Example XVIII (a), the corresponding methylobromide is obtained by reacting the ether base, prepared according to Example IX, with methylbromide. The resulting quaternary compound, on recrystallization from acetone, has a melting point of 150–152° C. The yield amounts to 62% of the theoretical yield.

*Example XIX*

Preparation of (2,5-endomethylene-Δ₃-cyclohexenyl) phenyl carbinol dimethylamino ethyl ether butylobromide:

2.7 g. of the compound described in Example I (a) are heated to 100° C. with 2.7 g. of butyl bromide for one hour. The reaction mixture is cooled and triturated with ether. The resulting crystals are filtered off by suction and are recrystallized from a mixture of acetone and ether (1:2). The crystals are highly hygroscopic. The yield amounts 68% of the theoretical yield.

*Example XX*

(a) Preparation of (2,5-endomethylene-Δ₃-cyclohexenyl) phenyl carbinol diethylamino ethyl ether benzylobromide:

3.0 g. of the compound described in Example VI are heated to 110–120° C. with 3.4 g. of benzylbromide for 15 minutes. The reaction mixture solidifies to a vitreous mass which is dissolved in hot acetic acid ethyl ester. The resulting solution is cooled and ether is added thereto. The precipitating oil crystallizes on boiling in acetic acid ethyl ester for a short period of time. The melting point of the resulting benzylobromide is 150° C. The yield amounts to 60% of the theoretical yield.

(b) Preparation of (2,5-endomethylene-Δ₃-cyclohexenyl)-phenyl carbinol-β-diethylamino ethyl ether ethylobromide:

3 g. of the ether base prepared according to Example VI and 2.2 g. of ethylbromide are heated in a sealed tube at 70° C. for 6 hours. The resulting ethylobromide is recrystallized from a mixture of acetone and ether (1:2) and has a melting point of 146–148° C. The yield amounts to 50% of the theoretical yield.

*Example XXI*

(a) Preparation of (2,5-endomethylene cyclohexyl) phenyl carbinol-β-diethylamino ethyl ether:

8.8 g. of (2,5-endomethylene-Δ₃-cyclohexenyl) phenyl carbinol-β-diethylamino ethyl ether obtained according to Example VI are dissolved in 100 cc. of ethanol. 0.2 g. of palladium black are added to said solution. The mixture is agitated with hydrogen and the pressure is kept at 3 atmospheres. The calculated amount of hydrogen is absorbed after 30 minutes. The catalyst is filtered off and ethanol is removed from the filtrate by vacuum distillation. The resulting residue is distilled in a high vacuum and yields 6.2 g. of the new saturated amino ether having a boiling point of 178–180° C./1 mm. Hg.

(b) Preparation of bis-(2,5-endomethylene cyclohexyl) carbinol-γ-diethylamino propyl ether:

Following the same procedure and using the same molecular proportions as in Example XXI (a), the corresponding saturated ether base is obtained by hydrogenating the unsaturated ether base prepared according to Example VIII (a). The resulting hydrogenation product has a boiling point of 203–204° C./10 mm. The yield amounts to 87% of the theoretical yield.

The citrate of said saturated ether base melts at 142° C. on recrystallization from ethanol.

An alternative process of producing the basic ethers of carbinols substituted by endocyclic groups according to the present invention comprises reacting halogen compounds of the following formula

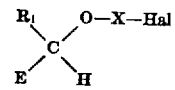

with amines of the formula

in which formulas E, R₁, X, Hal, and Am indicate the same groups and substituents as given hereinbefore, and converting the resulting amino ethers, if desired, into their acid addition salts by means of inorganic acids, for instance, hydrogen halide, or by means of organic carboxylic acids, for instance, citric acid, or into their quaternary ammonium compounds by means of alkyl halides or aralkyl halides or dialkyl sulfates.

The halogen compounds used as starting materials in this alternative process according to the present invention correspond to the formula

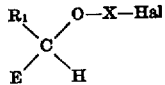

and are prepared by reacting carbinols of the formula

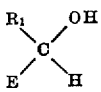

with dihalogeno compounds of the formula

Hal—X—Hal and especially with dihalogeno compounds carrying two different halogen atoms. The reaction may be carried out in the absence of solvents or in the presence of solvents, such as, for example, benzene, toluene, or alkanols such as ethanol. Hydrogen halide-binding agents, such as alkali metal, alkali amide, alkali alcoholate, or alkali hydroxide, are added to the reaction mixture. The reaction is carried out at elevated temperature and preferably at the boiling temperature of the solvent added to the reaction mixture.

Reaction of the halogeno ethers obtained thereby with amines of the formula

H—Am is also preferably effected in the presence of an inert solvent, such as, for example, benzene, toluene, or xylene, and at a temperature between about 50° C. and about 150° C. and preferably at the boiling temperature of the added solvent or, if desired, under pressure in a sealed tube.

This method of producing the new compounds will be described more in detail in the following examples without, however, being limited thereto.

*Example XXII*

(a) Preparation of (2,5-endomethylene-Δ3-cyclohexenyl) phenyl carbinol-γ-chloro propyl ether:

18.8 g. of (2,5-endomethylene-Δ3-cyclohexenyl) phenyl carbinol dissolved in 100 cc. of toluene are added to 2.3 g. of pulverized sodium metal in 150 cc. of toluene. The mixture is boiled under reflux for 20 hours. 16.5 g. of 1-chloro-3-bromo propane are added drop by drop thereto and the mixture is kept at boiling temperature for 48 hours. Water is then added thereto and the aqueous mixture is extracted with ether. The ether-toluene extract is dried over anhydrous sodium sulfate, the solvents are driven off by distillation, and the residue is subjected to high vacuum distillation. 20.5 g. of (2,5-endomethylene-Δ3-cyclohexenyl) phenyl carbinol-γ-chloro propyl ether having a boiling point of 116–118° C./2 mm. Hg are obtained.

(b) Preparation of (2,5-endomethylene-Δ3-cyclohexenyl)phenyl carbinol-γ-diethylamino propyl ether:

12.3 g. of the above mentioned chloro propyl ether are heated under reflux with 7 g. of diethylamine in 100 cc. of anhydrous xylene for 4 days. The reaction mixture is extracted by means of 2 N hydrochloric acid. The acid solution is washed with ether and the base is set free by the addition of concentrated ammonia. The crude base is dissolved in ether. The ethereal solution is dried and freed from ether by distillation in a vacuum. The resulting residue is distilled in a high vacuum and yields 10.8 g. of (2,5-endomethylene-Δ3-cyclohexenyl) phenyl carbinol-γ-diethylamino propyl ether of the boiling point 106–110° C./0.1 mm. Hg.

In place of diethylamine used in the preceding example, other dialkyl amines can be reacted with the halogeno ether, such as, for example, dimethylamine, dipropylamine, di-isopropylamine, dibutylamine, methyl ethylamine, methyl isobutylamine, and the like di-lower alkyl-amines, pyrrolidine, piperidine and morpholine, to yield the corresponding dialkylamino substituted ethers.

In place of the hydrochloride, citrate, tartrate, oxalate as prepared in the preceding examples, other addition salts of the new basic ethers with inorganic acids and organic carboxylic acids can be prepared. It is, of course, understood that, for therapeutical purposes, such acid addition salts are to be used which, in the doses administered, do not have any irritating or toxic effect upon the human system. Such other salts are, for instance, the salts with sulfuric acid, phosphoric acid, hydrobromic acid, and the salts with organic carboxylic acids, such as, for instance, acetic acid, propionic acid, butyric acid, caproic acid, pivalic acid, oxalic acid, maleic acid, malonic acid, fumaric acid, succinic acid, lactic acid, tartaric acid, malic acid, pyruvic acid, benzoic acid, toluic acids, cinnamic acid, mandelic acid, phthalic acid, cyclohexane carboxylic acid, cyclopentyl acetic acid, cyclohexyl propionic acid, phenyl acetic acid, hydrocinnamic acid, 2-furoic acid, nicotinic acid, isonicotinic acid, and others.

The carbinols substituted by endocyclic groups of the following formula

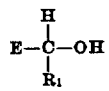

used as starting materials for carrying out the process according to the present invention as described in the preceding Examples I to XXII are also new compounds. They are preferably produced by reacting aldehydes of the formula

E—CHO with Grignard compounds of the formula

R₁—Mg.Hal or, respectively, by reacting aldehydes of the formula

R₁—CHO with Grignard compounds of the formula

E—Mg.Hal

In these formulas E, R₁ and Hal indicate the same groups and substituents as stated hereinbefore.

Said Grignard reaction is advantageously carried out in the presence of an inert solvent, for instance, of ether or tetrahydrofurane, and preferably at increased temperature, advantageously at the boiling point of the solvent.

Hydrolysis of the reaction products to carbinols is effected in a manner conventionally used in Grignard reactions, for instance, by the addition of ice and hydrochloric acid to the reaction mixture.

The following examples serve to illustrate the preparation of said new carbinols substituted by endocyclic groups. The reaction is, of course, not limited to said examples:

*Example XXIII*

The preparation of (2,5-endomethylene-Δ3-cyclohexenyl) phenyl carbinol:

The Grignard compound is prepared from 134 g. of bromo benzene, 19.6 g. of magnesium, and 150 cc. of ether; a solution of 49 g. of 2,5-endomethylene-Δ3-cyclohexenyl aldehyde in 50 cc. of ether is slowly added thereto. After addition is completed, the mixture is kept at boiling temperature for 3 hours. The resulting reaction mixture is decomposed by the addition of ice and hydrochloric acid. The aqueous phase is repeatedly extracted with ether. The combined ethereal solutions are washed first with sodium bicarbonate solution and then with water, dried over anhydrous sodium sulfate, and freed from ether by heating in a vacuum. The resulting residue is distilled in a vacuum and yields the carbinol in the form of a viscous oil boiling at 172–173° C./15 mm. Hg. Said oil, after standing for some time, solidifies in crystalline form.

The yield of the carbinol amounts to 83% of the theoretical yield.

When proceeding in the same manner by using the following reaction components, other carbinols useful in the preparation of the new basic ethers according to the present invention are obtained as is illustrated in the following examples.

*Example XXIV*

The preparation of (2,5-endomethylene-$\Delta_3$-cyclohexenyl) cyclohexyl carbinol:

The carbinol is obtained from cyclohexyl magnesium bromide and 2,5-endomethylene-$\Delta_3$-cyclohexenyl aldehyde in the form of a viscous oil which crystallizes on standing for a prolonged period of time. Its boiling point is 160–162° C./14 mm. Hg. The yield amounts to 75% of the theoretical yield.

*Example XXV*

The preparation of (2,5-endomethylene-$\Delta_3$-cyclohexenyl)-m-tolyl carbinol:

The carbinol is obtained from m-bromo toluene, magnesium, and 2,5-endomethylene-$\Delta_3$-cyclohexenyl aldehyde in the form of a viscous oil boiling at 146–147° C./0.7 mm. Hg. The yield amounts to 67% of the theoretical yield.

*Example XXVI*

The preparation of (2,5-endomethylene-$\Delta_3$-cyclohexenyl)-p-chloro phenyl carbinol:

The carbinol is obtained from 2,5-endomethylene-$\Delta_3$-cyclohexenyl magnesium bromide and p-chloro benzaldehyde in the form of a viscous oil which crystallizes on standing. Its boiling point is 200–202° C./16 mm. Hg. The yield amounts to 40% of the theoretical yield.

*Example XXVII*

The preparation of (2,5-endomethylene-$\Delta_3$-cyclohexenyl)-(3,4-methylene dioxy phenyl) carbinol:

The carbinol is obtained from 2,5-endomethylene-$\Delta_3$-cyclohexenyl magnesium bromide and piperonal in the form of a viscous oil boiling at 189–190° C./0.8 mm. Hg. The yield amounts to 30% of the theoretical yield.

*Example XXVIII*

The preparation of bis-(2,5-endomethylene-$\Delta_3$-cyclohexenyl) carbinol:

The carbinol is obtained from 2,5-endomethylene-$\Delta_3$-cyclohexenyl magnesium bromide and 2,5-endomethylene-$\Delta_3$-cyclohexenyl aldehyde in the form of a viscous oil which crystallizes on standing. Its boiling point is 169–170° C./16 mm. Hg. The yield amounts to 66% of the theoretical yield.

*Example XXIX*

The preparation of (2,5-endomethylene-$\Delta_3$-cyclohexenyl)-2-pyridyl carbinol:

The carbinol is obtained from 2,5-endomethylene-$\Delta_3$-cyclohexenyl magnesium bromide and pyridine-2-aldehyde in the form of an oil boiling at 140–141° C./0.3 mm. Hg. The yield amounts to 30% of the theoretical yield.

*Example XXX*

The preparation of (2,5-endomethylene-$\Delta_3$-cyclohexenyl)-2-thienyl carbinol:

The carbinol is obtained from 2,5-endomethylene-$\Delta_3$-cyclohexenyl magnesium bromide and thiophene-2-aldehyde in the form of a viscous oil which crystallizes on standing. Its boiling point is 137–139° C./0.4 mm. Hg. The yield is 60% of the theoretical yield.

An alternative method of producing said new carbinols substituted by endocyclic groups and useful as starting materials in the preparation of the respective basic ethers comprises reduction of the corresponding ketones to said secondary alcohols.

Said reduction of ketones substituted by endocyclic groups can be carried out according to processes conventionally employed in reducing ketones to secondary alcohols. Ketones which are substituted by unsaturated endocyclic groups are preferably reduced by means of lithium aluminum hydride. The following example serves to illustrate this mode of operation without, however, being limited thereto.

*Example XXXI*

The preparation of (2,5-endomethylene-$\Delta_3$-cyclohexenyl) phenyl carbinol:

7 g. of (2,5-endomethylene-$\Delta_3$-cyclohexenyl) phenyl ketone are dissolved in 50 cc. of ether. Said solution is added drop by drop, while cooling, to 3.6 g. of lithium aluminum hydride in 80 cc. of ether. Thereafter, the reaction mixture is heated under reflux for one hour. After cooling, water is added thereto. The resulting precipitate is filtered off by suction and washed with ether. The combined filtrates are dried over sodium sulfate, the ether is evaporated therefrom, and the residue is subjected to vacuum distillation. 6 g. of (2,5-endomethylene-$\Delta_3$-cyclohexenyl) phenyl carbinol of the boiling point: 172–173° C./15 mm. Hg are obtained.

As stated hereinbefore, the new basic ethers of carbinols substituted by endocyclic groups are excellent spasmolytic agents. Usually they are administered orally, for instance, in the form of tablets, pills, dragees, or other compressed form, or as powders, preferably filled in gelatin capsules and the like, or also in liquid form, for instance, as aqueous solution, sirup or the like, or, in case of difficultly soluble compounds, as emulsion, suspension and the like.

The new compounds can also be administered parenterally, for instance, by subcutaneous, intramuscular, or intravenous injection. For this purpose they are employed in the form of injectable solutions in water or isotonic salt solutions.

Rectal suppositories containing said compounds may also be employed for therapeutic purposes. Topical application is also possible.

The basic ethers according to the present invention are preferably not used as such in undiluted form but are diluted with suitable diluting agents as they are conventionally used as pharmaceutical carriers. Such dilution allows better and more economical use to be made thereof.

For making tablets, dragees, pills, powders, and other solid forms for medication, uniform dispersion of the active compound throughout the carrier is required. Such a fine and uniform dispersion is achieved, for instance, by intimately mixing and milling the basic ethers according to the present invention or their acid addition salts or quaternary ammonium compounds with a solid pulverulent diluent and, if required, with tableting adjuvants to the desired degree of fineness. One may also impregnate the finely pulverized, solid carrier, while milling, with a solution of the active compound in water or a suitable solvent and removing the solvent during such milling.

As solid pharmaceutical carriers, various inert pulverulent distributing agents, as they are conventionally used in the pharmaceutical industry, may be employed.

Solid diluents which are admixed to the active compounds, especially when preparing tablets, pills, dragees, and other compressed forms, or powders to be placed in capsules of absorbable material, such as the usual gelatin capsule, or in powder packets, are the commonly used diluting agents, such as cornstarch, dextrose, lactose, sugar, and the like. For making tablets and other compressed medication forms, binders, such as pectins, gelatin, gum arabic, methyl cellulose, yeast extract, agar, tragacanth, and lubricants, such as magnesium stearate, calcium stearate, stearic acid, talc and the like, are used.

The amount of basic ether present in such preparations may, of course, vary. It is necessary that the active ingredient be contained therein in such an amount that a suitable dosage will be ensured. Ordinarily the preparations should not contain less than about 0.01% of the active basic ether. The preferred amount in orally administered preparations, such as tablets, powders, and the like, is between about 0.01% and about 50% and preferably between about 5% and about 30% of the active compound, i. e. between about 20 mg. and about 80 mg. About 30 mg. per tablet weighing 0.2 g. have proved to be especially useful.

The new basic ethers and their acid addition salts and quaternary ammonium compounds have proved to be of great therapeutical value for their relaxant effect upon spasms of the smooth muscles of the abdomen, vasospasms, spasms of the bladder and the uterus, dysmenorrhea, spasms during labor, ulcers of the gastro-intestinal tract, hyperacidity, vegetative dystonia, in ophthalmology for diagnostic and therapeutic purposes and for dilation of the pupils, for the treatment of asthmatic conditions, etc.

The doses to be administered vary according to the type of action desired, whether said action is to be like that of papaverine, or like that of atropine, or whether a combined papaverine and atropine action is needed. The following Table I indicates the approximate highest doses to be administered orally or parenterally of the new basic ethers. It is, of course, understood that the physician will determine the proper amounts to be given to a patient depending upon the symptoms to be alleviated and the patient's condition and that the doses given in Table I are by no means limiting the use of the new basic ethers to such dosage.

TABLE I

| Desired action | Approximate Maximum Dose | |
|---|---|---|
| | Orally, gram | Parenterally, gram |
| Papaverine-like action | 0.2 | 0.1 |
| Atropine-like action | 0.06 | 0.03 |
| Combined papaverine-like and atropine-like action | 0.08 | 0.04 |

The following Table II is given to demonstrate the high spasmolytic activity of the basic ethers of carbinols substituted by endocyclic groups as they are obtained according to the present invention whereby the spasmolytic activity of two of the most widely used and effective spasmolytic agents, namely the standard musculotropic antispasmodic papaverine and the standard neurotropic parasympathetic blocking agent atropine, is given in comparison.

It is evident that of these nineteen compounds, the compounds listed above under No. 1, 2, 3, 5, 6, 9, 16, 17 and 19 are the most effective compounds.

We claim:
1. A basic ether compound selected from the group consisting of a basic ether of a carbinol substituted by an endocyclic group, said basic ether corresponding to the formula

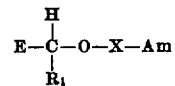

and a salt of said basic ether corresponding to the formula

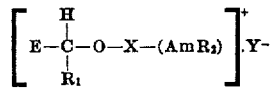

wherein E is an endocyclic group selected from the group consisting of the 2,5-endomethylene cyclohexyl group and the 2,5-endomethylene-$\Delta_3$-cyclohexenyl group, X is a lower alkylene group, Am is a basic group selected from the group consisting of a di-lower alkylamino group, the pyrrolidino group, the piperidino group, and the morpholino group, $R_1$ is a member selected from the group consisting of the 2,5-endomethylene-$\Delta_3$-cyclohexenyl group, the 2,5-endomethylene cyclohexyl group, the 2-pyridyl group, and a phenyl group of the formula

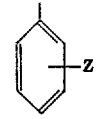

wherein Z is a member selected from the group consisting of hydrogen, halogen, a lower alkyl group, and a lower alkoxy group, $R_2$ is a member selected from the group consisting of hydrogen, a lower alkyl group, and a benzyl group, and Y is a member selected from the group consisting of halogen, tartrate, oxalate and citrate.

2. (2,5-endomethylene-$\Delta_3$-cyclohexenyl)- phenyl-carbinol-2-morpholino-ethyl ether.

3. (2,5-endomethylene-$\Delta_3$-cyclohexenyl)- phenyl-carbinol-$\beta$-pyrrolidino-ethyl ether-methobromide.

4. (2,5-endomethylene-$\Delta_3$-cyclohexenyl) phenyl carbinol-$\beta$-dimethylamino ethyl ether.

5. The (2,5-endomethylene - $\Delta_3$ - cyclohexenyl) phenyl carbinol-$\beta$-diethylamino ethyl ether methobromide.

6. The (2,5-endomethylene - $\Delta_3$ - cyclohexenyl) phenyl carbinol $\beta$-pyrrolidino ethyl ether.

TABLE II

| No. | Example No. | Salt | Boiling point of the base, °C./mm. Hg. | Melting point of the salt, °C. | Spasms—relaxing action compared with— | |
|---|---|---|---|---|---|---|
| | | | | | atropine | papaverine |
| 1 | 1a | hydrochloride | 130-132/0.1 | 140 | 1.5 | 0.5 |
| 2 | 18a | methobromide | 130-132/0.1 | 167 | 1.0 | 0.33 |
| 3 | 17b | methoiodide | 130-132/0.1 | 166-168 | 1.5 | 0.2 |
| 4 | 6 | hydrochloride | 171-173/0.1 | 116-118 | 0.1 | 1.0 |
| 5 | 18b | methobromide | 171-173/0.1 | 126-128 | 1.5 | 2.0 |
| 6 | 17c | methoiodide | 171-173/0.1 | 92-94 | 2.0 | 0.33 |
| 7 | 20 | benzylobromide | 171-173/0.1 | 150 | 0.5 | 0.67 |
| 8 | 18c | methobromide | 168-170/0.5 | 150-152 | 0.5 | 0.8 |
| 9 | 9 | hydrochloride | 168-170/0.5 | 147 | 0.1 | 1.0 |
| 10 | 11 | do | 159-160/0.4 | 181 | 0.05 | 0.5 |
| 11 | 7 | citrate | 135-136/0.03 | 60 | 0.02 | 0.67 |
| 12 | 8b | hydrochloride | 139-141/0.2 | 130-131 | 0.017 | 1.0 |
| 13 | 12 | do | 130-131/0.8 | 130-131 | 0.5 | 1.0 |
| 14 | 15 | do | 188-189/0.8 | | 0.02 | 0.5 |
| 15 | 16 | do | 141/005 | hygroscopic | 1.0 | 0.25 |
| 16 | 13 | do | 131/0.1 | 147 | 0.1 | 1.0 |
| 17 | 17d | methoiodide | 131/0.1 | 177-179 | 1.0 | 0.15 |
| 18 | 1b | hydrochloride | 205-206/11 | 169-171 | 0.02 | 1.0 |
| 19 | 8a | citrate | 205-206/7 | 145 | 0.08 | 1.0 |

7. The process of producing basic ether compounds selected from the group consisting of basic ethers of carbinols having the structural formula

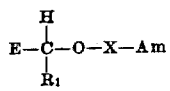

and their salts having the structural formula

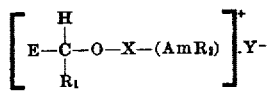

in which formulas E is an endocyclic group selected from the group consisting of 2,5-endomethylene-cyclohexyl, and 2,5-endomethylene-Δ3-cyclohexenyl, R₁ is selected from the group consisting of 2,5-endomethylene-cyclohexyl, 2,5-endomethylene-Δ3-cyclohexenyl, 2-pyridyl, and a phenyl radical having the structural formula

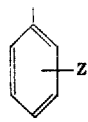

wherein Z is selected from the group consisting of hydrogen, halogen, lower alkyl, and lower alkoxy, X is a lower alkylene radical, Am is selected from the group consisting of di-lower alkyl-amino, pyrrolidino, piperidino and morpholino, R₂ is selected from the group consisting of hydrogen, lower alkyl and benzyl, and Y is selected from the group consisting of halogen, tartrate, oxalate and citrate, which comprises reacting a carbinol having the structural formula

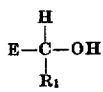

wherein E and R₁ have the above-indicated meaning, with a tertiary amino lower alkyl halide having the structural formula

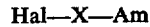

wherein X and Am have the above-indicated meaning and Hal indicates a halogen atom, in the presence of a hydrogen halide binding agent, to cause etherification of the carbinol, separating the resulting basic ether from the reaction mixture, and, for conversion of said ether into a salt thereof having the above-indicated structural formula, reacting said basic ether with a salt-forming compound selected from the group consisting of hydrogen halides, tartaric acid, oxalic acid and citric acid, lower alkyl halides and benzyl halides.

8. A process according to claim 7, wherein the hydrogen halide binding agent is an agent selected from the group consisting of an alkali metal, an alkali amide, an alkali alcoholate, an alkali hydroxide, and an alkali carbonate.

9. A process according to claim 7, wherein etherification is effected in solution in an inert organic solvent.

10. A process according to claim 7, wherein etherification is effected at a temperature between about 20° C. and about 150° C.

11. A process according to claim 7, wherein salt formation is effected in solution in a solvent.

12. A process according to claim 7, wherein salt formation is effected while cooling the reaction mixture.

13. A process according to claim 7, wherein salt formation is effected at a temperature between about 30° C. and about 150° C.

14. A process according to claim 7, wherein salt formation is effected at a temperature between about 30° C. and about 150° C. in a sealed reaction container.

References Cited in the file of this patent

UNITED STATES PATENTS

| | | |
|---|---|---|
| 2,334,517 | Tucker | Nov. 16, 1943 |
| 2,410,783 | Hardman | Nov. 5, 1946 |
| 2,485,550 | Aeschlimann et al. | Oct. 25, 1949 |
| 2,500,913 | Schexnailder | Mar. 14, 1950 |
| 2,577,234 | Cusic | Dec. 4, 1951 |
| 2,606,192 | Shelton et al. | Aug. 5, 1952 |
| 2,606,195 | Tilford et al. | Aug. 5, 1952 |
| 2,606,208 | Burtner | Aug. 5, 1952 |
| 2,617,831 | Mowry | Nov. 11, 1952 |
| 2,625,547 | Lawson et al. | Jan. 13, 1953 |
| 2,655,511 | Woodruff | Oct. 13, 1953 |
| 2,688,021 | Jenkins | Aug. 31, 1954 |
| 2,716,121 | Denton | Aug. 23, 1955 |

FOREIGN PATENTS

| | | |
|---|---|---|
| 624,117 | Great Britain | May 27, 1949 |

OTHER REFERENCES

Jour. Am. Chem. Soc., vol. 70, pp. 4001–4009 (1948).

UNITED STATES PATENT OFFICE

CERTIFICATE OF CORRECTION

Patent No. 2,812,327                                    November 5, 1957

Gerhard Ohnacker et al.

It is hereby certified that error appears in the above numbered patent requiring correction and that the said Letters Patent should read as corrected below.

In the grant, line 3 and in the heading to the printed specification, lines 6 and 7, address of the assignee, for "Riss, Germany" read --Biberach a.d. Riss, Germany--; in the printed specification, column 2, line 36, for "toluence" read --toluene--.

Signed and sealed this 21st day of January 1958.

(SEAL)
Attest:

KARL H. AXLINE

Attesting Officer                                             ROBERT C. WATSON
                                                                      Commissioner of Patents